United States Patent [19]

Yamada

[11] Patent Number: 4,548,481
[45] Date of Patent: Oct. 22, 1985

[54] VARIABLE MAGNIFICATION OBSERVATION OPTICAL DEVICE

[75] Inventor: Kenji Yamada, Narashino, Japan

[73] Assignee: Nippon Kogaku K.K., Japan

[21] Appl. No.: 549,325

[22] Filed: Nov. 7, 1983

[51] Int. Cl.$^4$ .......................... G02B 7/04; G02B 21/00; G02B 23/00

[52] U.S. Cl. .................................... 350/559; 350/518; 350/556

[58] Field of Search ............... 350/559, 560, 518, 519, 350/555, 556, 554, 552, 563, 448, 449, 450

[56] References Cited

FOREIGN PATENT DOCUMENTS

| 98250 | 7/1898 | Fed. Rep. of Germany | 350/556 |
| 504032 | 4/1939 | United Kingdom | 350/559 |

*Primary Examiner*—Jon W. Henry
*Attorney, Agent, or Firm*—Shapiro and Shapiro

[57] ABSTRACT

A variable magnification observation optical device comprises an objective lens, an eyepiece disposed rearwardly of the objective lens, a magnification changing lens disposed between the objective lens and the eyepiece, a support member for supporting the magnification changing lens so that the principal point thereof can be changed from one to the other of the objective lens side position and the eyepiece side position relative to an object image formed between the objective lens and the eyepiece by the objective lens, the support member having a field stop for at least one of a state in which the principal point of the magnification changing lens is positioned on the objective lens side and a state in which the principal point of the magnification changing lens is positioned on the eyepiece side, and change-over means for moving the support member to change the principal point of the magnification changing lens from said one position to said other position, thereby changing over the magnification of the optical device.

8 Claims, 20 Drawing Figures

VARIABLE MAGNIFICATION OBSERVATION OPTICAL DEVICE

BACKGROUND OF THE INVENTION

1. Field of the Invention

This invention relates to the observation optical system of a telescope, binoculars, a microscope or the like, and particularly to the magnification changing optical device thereof.

2. Description of the Prior Art

There is known a method of providing a magnification changing mechanism for an objective lens or an eyepiece or interchanging the objective lens or the eyepiece to effect a magnification change in a telescope or a microscope. The latter is much simpler in mechanism than the former, but it requires the cumbersome procedure of interchange and an optical system for interchange and is unsuitable for optical machines to the portability of which importance is attached, for example, binoculars or the like. Further, if the field stop is located at an inaccurate position, the marginal edge of the field of view is blurred and therefore, it is necessary to provide the field stop always at an optimum position even after a magnification change.

SUMMARY OF THE INVENTION

It is an object of the present invention to provide an observation optical device which can quickly effect a magnification change by a simple mechanism.

It is a further object of the present invention to provide a magnification changing optical device in which field stops are disposed always at optimum positions even after magnification change.

The variable magnification observation optical device according to the present invention is an observation optical device which basically comprises an objective lens and an eyepiece and in which a lens group having a positive or negative refractive power is provided between the objective lens and the eyepiece and the principal point of the lens group is moved from one side to the other side of an intermediate image formed between the objective lens and the eyepiece by the objective lens, namely, the rearward focus position of the objective lens, thereby accomplishing a magnification change.

The invention will become more fully apparent from the following detailed description thereof taken in conjunction with the accompanying drawings.

DESCRIPTION OF THE PREFERRED EMBODIMENTS

Examples in which the present invention is applied to the optical system of a telescope will hereinafter be described by reference to the drawings.

Figure 1A:
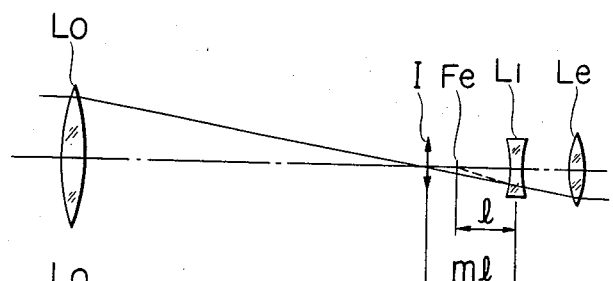
FIGS. 1 to 8 schematically show the constructions of the optical systems of first to eighth embodiments of the present invention, FIGS. 1A to 8A showing the low magnification state and FIGS. 1B to 8B showing the high magnification state.
Figure 1B:
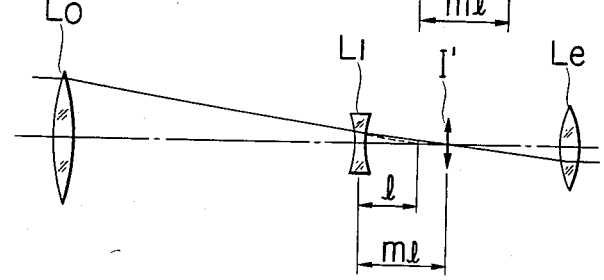

In a first embodiment of the present invention, as shown in FIGS. 1A and 1B, a lens group $L_1$ of negative refractive power is provided between an objective lens $L_o$ and an eyepiece $L_e$, and a low magnification is provided when the negative lens group $L_1$ lies between the intermediate image I by the objective lens $L_o$, namely, the rearward focus position of the objective lens $L_o$, and the eyepiece $L_e$ (FIG. 1A), and a high magnification is provided when the negative lens group $L_1$ is moved to between the objective lens $L_o$ and the intermediate image I by the objective lens (FIG. 1B).

When the focal lengths of the objective lens $L_o$, the eyepiece $L_e$ and the negative lens group $L_1$ are $f_o$, $f_e$ and $f_1$, respectively, the negative lens group $L_1$ is provided at a distance $l$ from the forward focus $F_e$ of the eyepiece $L_e$ toward the eyepiece as shown in FIG. 1A, and the focal length $f_1$ of the negative lens group $L_1$ is determined so that the relation that $$\frac{1}{f_1} = -\frac{1}{l} + \frac{1}{ml}, \text{ that is, } f_1 = \frac{ml}{1-m}$$

is satisfied for a positive number m greater than 1. At this time, the focal length of the composite system of the eyepiece $L_e$ and the negative lens group $L_1$ is $mf_e$.

Thus, when the forward focus of this composite system and the rearward focus of the objective lens $L_o$ are made coincident with each other, the magnification of the telescope is $f_o/mf_e$.

When the negative lens group $L_1$ is then changed from this state to the position as shown in FIG. 1B, that is, from the rearward focus of the objective lens $L_o$, namely, the position of the intermediate image I of an infinity object, to a position at a distance $l$ toward the objective lens, the focal length of the composite system of the objective lens $L_o$ and the negative lens group $L_1$ becomes $mf_o$. In this case, the negative lens group $L_1$ has changed its position on the optical axis by $l(1+m)$, and the rearward focus of the composite system and the forward focus of the eyepiece $L_e$ are coincident with each other and the magnification of the telescope is $mf_o/f_e$. Comparing this with the case of FIG. 1A, the magnification has been increased $m^2$ times and thus, a magnification change is realized.

Figure 2A:
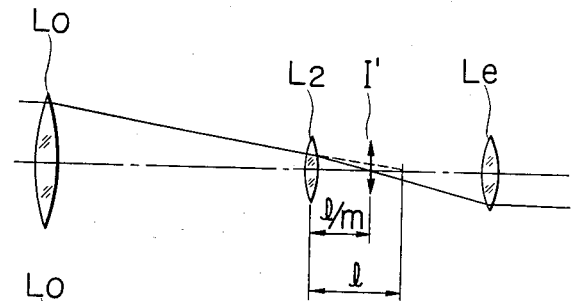
Figure 2B:
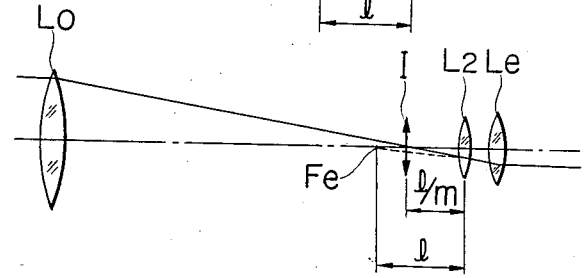

In a second embodiment of the present invention, as shown in FIGS. 2A and 2B, a positive lens group $L_2$ instead of the negative lens group $L_1$ is provided between the objective lens $L_o$ and the eyepiece $L_e$. FIG. 2A shows the low magnification state and FIG. 2B shows the high magnification state.

When the focal length of the positive lens group is $f_2$, as shown in FIG. 2A, the positive lens group $L_2$ is provided at a position at a distance $l$ from the rearward focus of the objective lens $L_o$, namely, the position of the image I of an infinity object by the objective lens, toward the objective lens and the focal length $f_2$ of the positive lens group $L_2$ is determined so that the relation that $$\frac{1}{f_2} = \frac{-1}{l} + \frac{m}{l}, \text{ that is, } f_2 = \frac{l}{m-1}$$

is satisfied for a positive number m greater than 1. The focal length of the composite system of the objective lens $L_o$ and the positive lens group $L_2$ is $f_o/m$ and, when the rearward focus of this composite system and the forward focus of the eyepiece $L_e$ are made coincident with each other, the magnification of the telescope becomes $f_o/mf_e$. When the positive lens group $L_2$ is then changed to a position at a distance l from the forward focus $F_e$ of the eyepiece $L_e$ toward the eyepiece as shown in FIG. 2B, the focal length of the composite system of the eyepiece $L_e$ and the positive lens group $L_2$ becomes $f_e/m$. Thus, at this time, the positive lens group $L_2$ has changed its position on the optical axis by $$l\left(1 + \frac{1}{m}\right),$$

and the forward focus of the composite system of the eyepiece $L_e$ and the positive lens group $L_2$ is coincident with the rearward focus of the objective lens $L_o$, namely, the position of the intermediate image I of an infinity object and the magnification of the telescope becomes $mf_o/f_e$. Thus, the magnification has been increased $m^2$ times as compared with the case of FIG. 2A.

As shown in the first and second embodiments, a magnification change can be easily accomplished by a simple construction in which only a positive or negative lens group having a predetermined focal length is simply moved from the intermediate image I by the objective lens, namely, one of the rearward focuses of the objective lens to the other. The movement of the positive or negative lens group for magnification change provided according to the present invention may simply be effected along the optical axis and across the intermediate image, but alternatively, a construction may be adopted in which such lens group is removably inserted in the optical path.

The first embodiment which employs a negative lens as the magnification changing lens is advantageous for the correction of Petzval sum as compared with the second embodiment which employs a positive lens as the magnification changing lens and accordingly, it can correct curvature of image field and astigmatism better. Also, the eye relief (the distance from the eyepiece to the eye point) can be made longer, and this leads to the ease of observation and is advantageous particularly during high magnification.

Figure 3A:
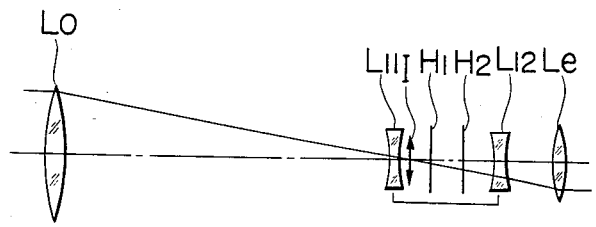
Figure 3B:
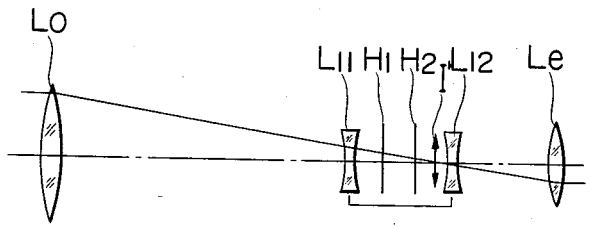

In a third embodiment of the present invention, as shown in FIGS. 3A and 3B which show the low magnification state and the high magnification state, respectively, a negative lens group movable for magnification change is comprised of a negative forward group $L_{11}$ and a negative rearward group $L_{12}$ disposed at a predetermined interval. In this embodiment, a magnification change is accomplished by moving the forward and rearward groups $L_{11}$ and $L_{12}$ together with each other so that the principal points $H_1$, $H_2$ of the composite system of the forward and rearward groups $L_{11}$ and $L_{12}$ move across the rearward focus of the objective lens $L_o$, namely, the object image I by the objective lens. The combined focal length of the negative lens groups and the position of movement of the composite principal point are similar to those in the first embodiment, and the low magnification state of FIG. 3A and the high magnification state of FIG. 3B correspond to FIGS. 1A and 1B, respectively.

Figure 4A:
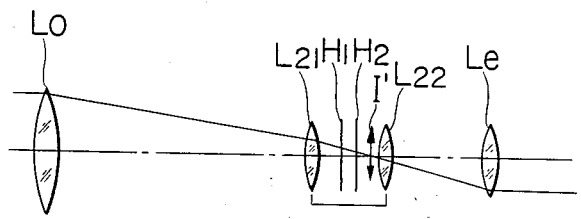
Figure 4B:
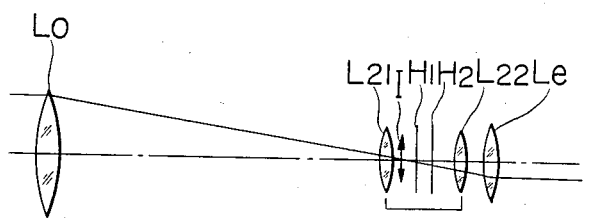

The low magnification state and the high magnification state of a fourth embodiment in which the positive lens group is separated into and comprised of a positive forward group $L_{21}$ and a positive rearward group $L_{22}$ are shown in FIGS. 4A and 4B, respectively. Again in this embodiment, a magnification change can be accomplished by moving the forward and rearward groups together with each other so that the composite principal points $H_1$, $H_2$ of the forward and rearward groups move across the rearward focus of the objective lens $L_o$, namely, the object image I by the objective lens. The combined focal length of the positive lens groups and the position of movement of the composite principal point are similar to those in the second embodiment, and the low magnification state of FIG. 4A and the high magnification state of FIG. 4B correspond to FIGS. 2A and 2B, respectively.

In the above-described third and fourth embodiments, only the principal point of the negative or positive movable lens group moves across the intermediate image and the lens itself does not cross the intermediate image and therefore, flaws or dust on the lens surface may not be seen during the movement of the lens groups for magnification change. In each of the above-described embodiments, if the negative lens group $L_1$ or the positive lens group $L_2$ as the movable lens group for magnification change is continuously moved along the optical axis, any desired medium magnification can be obtained. However, it is necessary to move the objective lens $L_o$ or the eyepiece $L_e$ for re-focusing because the imaging point is varied. Also, if the objective lens or the eyepiece is continuously moved in response to movement of the movable lens group, there can be provided a zoom lens.

Figure 5A:
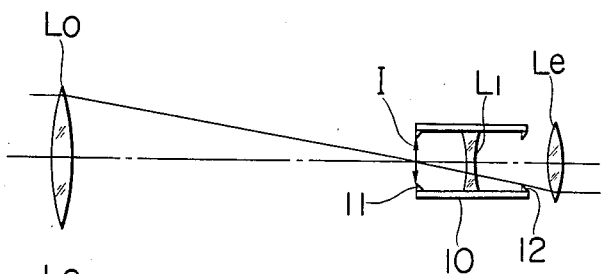
Figure 5B:
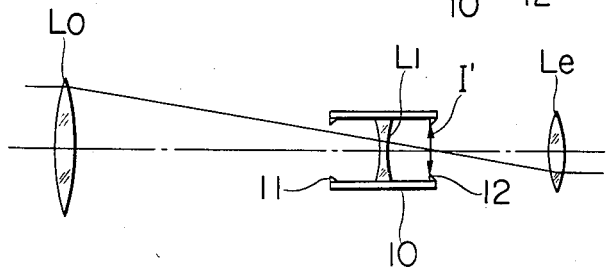

Description will now be made of an embodiment in which field stops can be provided at optimum positions even during magnification change in the above-described optical system according to the present invention. In a fifth embodiment shown in FIGS. 5A and 5B, a field stop 11 for low magnification is provided at that side of the movable negative lens group $L_1$ for magnification change which is adjacent to the objective lens $L_o$ and a field stop 12 for high magnification is provided at that side of the movable negative lens group $L_1$ which is adjacent to the eyepiece $L_e$, the field stops 11 and 12 being movable in the direction of the optical axis with the negative lens group $L_1$ by a moving cylinder 10. The field stop 11 for low magnification is coincident with the position of the intermediate image I by the objective lens $L_o$ during the low magnification in which the negative lens group $L_1$ is positioned more adjacent to the eyepiece $L_e$ as shown in FIG. 5A, and the field stop 12 for high magnification is coincident with the position of the intermediate image I' by the objective lens $L_o$ and the negative lens group $L_1$ during the high magnification in which the negative lens group $L_1$ is positioned more adjacent to the objective lens $L_o$ as shown in FIG. 5B. As can be seen from FIGS. 1A and 1B which show the first embodiment of the fundamental construction of the present embodiment, the distances from the negative lens group to the intermediate images I and I' during low magnification and during high magnification, respectively, are equal to each other, i.e., ml, and accordingly, the field stops for low magnification and for high magnification, respectively, are provided at substantially equal distances at the opposite sides of the negative lens group $L_1$.

Figure 6A:
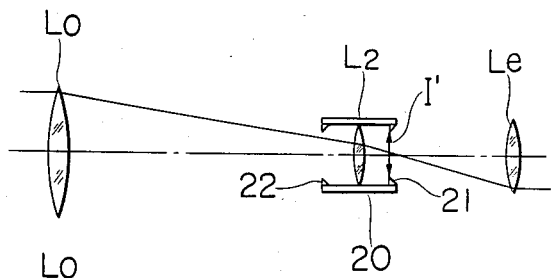
Figure 6B:
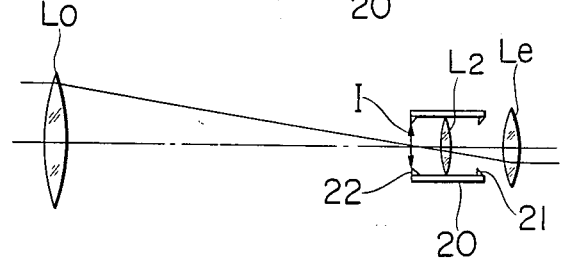

A sixth embodiment shown in FIGS. 6A and 6B is one in which, as in the above-described fifth embodiments, field stops are added to the construction shown as the second embodiment in FIGS. 2A and 2B. That is, a field stop 21 for low magnification is provided at that side of the positive lens group $L_2$ which is adjacent to the eyepiece $L_e$ and a field stop 22 for high magnification is provided at that side of the positive lens group $L_2$ which is adjacent to the objective lens $L_o$, the field stops 21 and 22 being made integral with the positive lens group by a moving cylinder 20.

The field stop 21 for low magnification is coincident with the position of the intermediate image I' by the objective lens $L_o$ and the positive lens group $L_2$ during the low magnification in which the positive lens group $L_2$ is positioned more adjacent to the objective lens $L_o$ as shown in FIG. 6A, and the field stop 22 for high magnification is coincident with the position of the intermediate image I by the objective lens $L_o$ during the high magnification in which the positive lens group $L_2$ is positioned more adjacent to the eyepiece $L_e$ as shown in FIG. 6B. As can be seen from FIGS. 2A and 2B which show the fundamental construction of the present embodiment, the distances from the positive lens group $L_2$ to the intermediate images I' and I during low magnification and during high magnification, respectively, are equal to each other, i.e., l/m, and the distances from the positive lens group $L_2$ to the field stops 21 and 22 are substantially equal to each other.

Figure 7A:
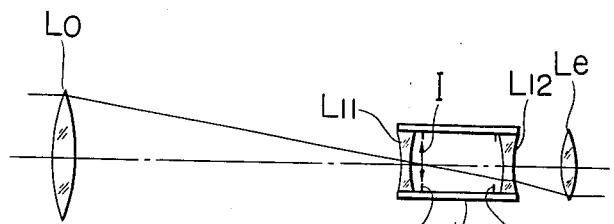
Figure 7B:
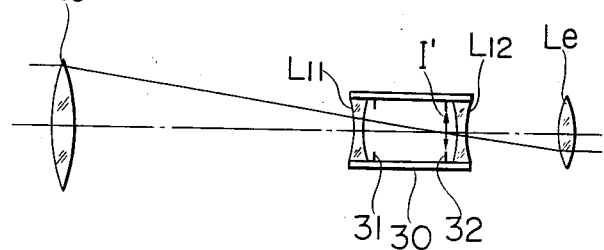

Description will now be made of seventh and eighth embodiments in which field stops are optimally disposed in case where the negative or positive lens group for magnification change is separated into and comprised of a forward group and a rearward group as in the third and the fourth embodiment. In the seventh embodiment, as shown in FIGS. 7A and 7B, a field stop 31 for low magnification and a field stop 32 for high magnification are provided between the forward negative lens $L_{11}$ and the rearward negative lens $L_{12}$, the field stops 31 and 32 being made integral with the respective negative lenses by a moving cylinder 30. The field stop 31 for low magnification is coincident with the position of the intermediate image I during the low magnification in which the moving cylinder 30 is positioned more adjacent to the eyepiece $L_e$ as shown in FIG. 7A, and the field stop 32 for high magnification is coincident with the position of the intermediate image I' during the high magnification in which the moving cylinder 30 is positioned more adjacent to the objective lens $L_o$ as shown in FIG. 7B.

Figure 8A:
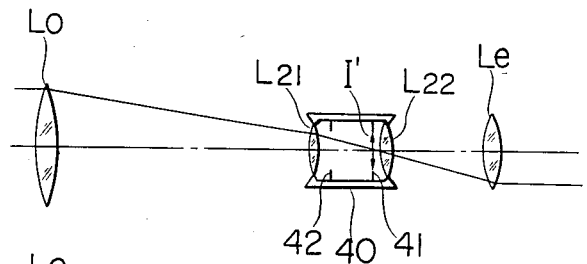
Figure 8B:
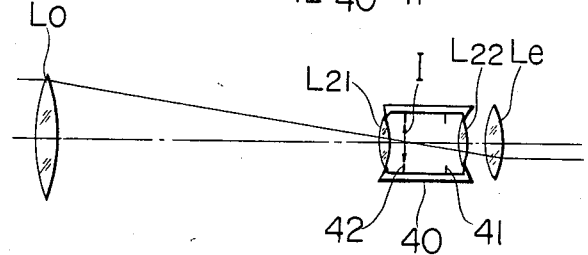

In the eighth embodiment shown in FIGS. 8A and 8B, a field stop 41 for low magnification and a field stop 42 for high magnification are provided between the forward positive lens $L_{21}$ and the rearward positive lens $L_{22}$, the field stops 41 and 42 being made integral with the respective positive lenses by a moving cylinder 40. In this embodiment, the field stop 41 for low magnification is coincident with the position of the intermediate image I' during the low magnification in which the moving cylinder 40 is positioned more adjacent to the objective lens $L_o$ as shown in FIG. 8A, and the field stop 42 for high magnification is coincident with the position of the intermediate image I during the high magnification in which the moving cylinder 40 is positioned more adjacent to the eyepiece $L_e$ as shown in FIG. 8B. Again in these third and fourth embodiments, the field stops for low magnification and high magnification are provided at substantially equal distances from the composite principal point of the movable lens groups.

Thus, according to the magnification changing optical system of the fifth to eighth embodiments, field stops are provided at optimum positions both during the low magnification and during the high magnification to enable a clear image to be observed over the entire field of view without the circumference of the field of view being blurred.

Figure 9:
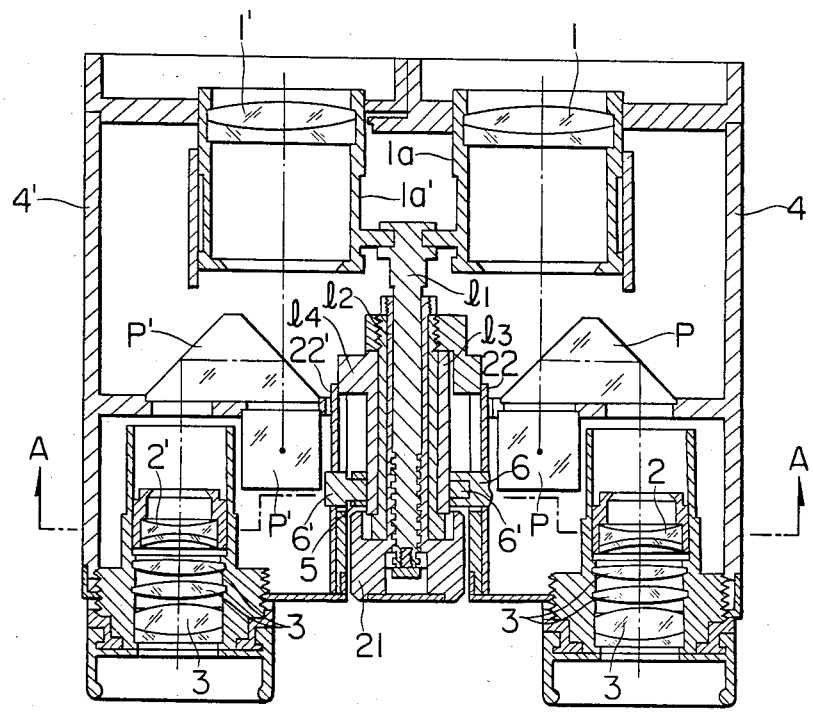
FIG. 9 shows the observation optical device according to an embodiment of the present invention and is a cross-sectional view of the optical system thereof taken along the optical axis and of the focusing and magnification changing mechanisms thereof taken along the center of the center axis $l_1$.
Figure 10:
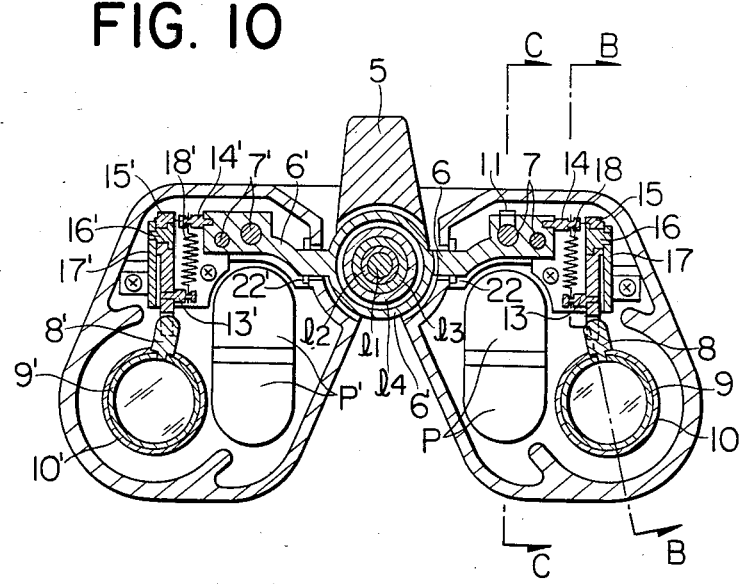
FIG. 10 is a cross-sectional view taken along line A—A of FIG. 9.
Figure 11:
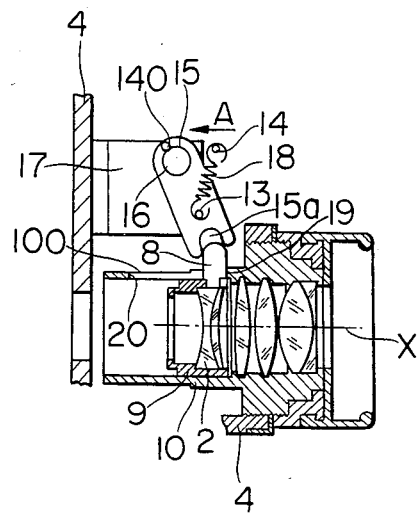
FIG. 11 is a cross-sectional view taken along line B—B of FIG. 10.
Figure 12:
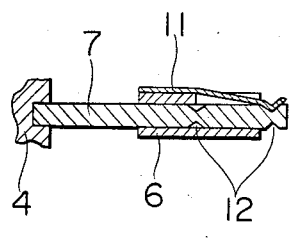
FIG. 12 is a cross-sectional view taken along line C—C of FIG. 10.

Reference is now had to FIGS. 9 to 12 to describe an embodiment in which the optical system as described above is adopted in binoculars. FIG. 9 is a cross-sectional view of the optical system taken along the optical axis and of the focusing and magnification changing mechanisms taken along the center of the center axis, FIG. 10 is a cross-sectional view taken along line A—A of FIG. 9, FIG. 11 is a cross-sectional view taken along line B—B of FIG. 10 and showing a moving mechanism for the magnification changing lens 2, and FIG. 12 is a cross-sectional view taken along line C—C of FIG. 10 and showing a positioning mechanism for the connecting member 6. The internal constructions of the right lens barrel 4 and the left lens barrel 4' are substantially symmetrical and therefore, the members in the left lens barrel 4' which correspond to the members in the right lens barrel 4 are given primed reference numerals and chiefly the right lens barrel 4 will be described with the description of the left lens barrel 4' being omitted.

A poroprism P for erecting the image is disposed between an objective lens 1 and a magnification changing lens 2 as the negative lens group. The holding cylinder 1a of the objective lens 1 is connected to a central shaft $l_1$, and a focusing cylinder $l_2$ having a focusing handle 21 secured to one end thereof is threadedly engaged with a screw portion formed on the outer periphery of the central shaft $l_1$. A connecting cylinder $l_3$ for connecting the right and left lens barrels 4 and 4' is fitted to the outer side of the focusing cylinder $l_2$. A support cylinder $l_4$ integral with the left lens barrel 4' is fitted to the outer side of the connecting cylinder $l_3$, and the support cylinder $l_4$ is held between the flange portion of the connecting cylinder $l_3$ and the right lens barrel 4 threadedly engaged by the screw portion at the end of the connecting cylinder $l_3$. A connecting member 6' for moving the magnification changing lens 2' in the left lens barrel 4' in the direction of the optical axis is provided axially integrally with a connecting member 6 which is integral with an operating member 5 (FIG. 9). The connecting member 6 is for moving the magnification changing lens 2 in the right lens barrel 4, and the connecting members 6 and 6' are movable axially of the central shaft $l_1$ by the operating member 5.

A mechanism for moving the magnification changing lens 2 in the direction of the optical axis will now be described by reference to FIGS. 10, 11 and 12. The connecting member 6 moves rectilinearly by being guided by two guide shafts 7 fixed to the lens barrel 4. The guide shafts 7 are disposed parallel to the central shaft $l_1$. As shown in FIG. 12, each guide shaft 7 has two grooves 12 formed circumferentially thereof at different axial positions. A plate spring member 11 secured to the connecting member 6 is received in these grooves 12. The plate spring member 11 and the grooves 12 together constitute a click. A pin 14 is fixed to the connecting member 6, and a toggle spring 18 has one end thereof fixed to the pin 14 and the other end fixed to a pin 13 which is fixed to a pivotable member 15. The pivotable member 15 is pivotable in a plane substantially containing the optical axis X about a central member 16 provided in a support member 17 fixed to the lens barrel 4. As shown in FIG. 11, a recess 15a engaged with an engaging projection 8 which is integral with a magnification changing lens barrel 9 is formed in the lower end of the pivotable member 15. The magnification changing lens barrel 9 is slidable in an eyepiece barrel 10, and the projection 8 is provided projectedly from a slit 100 formed in the eyepiece barrel 10 along the optical axis. The opposite ends of the slit 100 are used as a low magnification side limit 19 and a high magnification side limit 20. The connecting member 6, the engaging pin 8, the pins 13, 14, the pivotable member 15 and the toggle spring 18 together constitute a toggle spring device.

With such a construction, in order that the magnification changing lens 2 may effect a magnification change from the low magnification side to the high magnification as shown, the operating member 5 may be slidden toward the objective lens 1. That is, as shown in FIG. 11, the pivotable member 15 biases the engaging projection 8 by means of the spring 18 so as to urge the magnification changing lens barrel 9 against the low magnification side limit 19. This state corresponds to FIG. 1A. As the operating member 5 is pushed from this state toward the objective lens 1, the connecting members 6 and 6' are moved with the movement of the operating member 5 and the pin 14 supporting the spring 18 is moved in the direction of arrow A in FIG. 11, namely, a direction parallel to the optical axis and, when the pin 14 goes beyond a position 140 on the extention passing through the centers of the pin 13 and the central member 16, the pivotable member 15 is forced to rotate by the force of the spring 18 and the magnification changing lens barrel 9 momentarily bears against the high magnification side limit 20 and is urged against it. Change-over from the high magnification side to the low magnification side may be likewise accomplished by an operation converse to what has been described above. With such a construction in which the magnification changing lens 2 selects the low magnification side or the high magnification side alternatively, as can be understood from FIGS. 1A and 1B, the dust on the magnification changing lens 2 observed through the eyepiece 3 when the magnification changing lens 2 crosses the forward focus $F_e$ of the eyepiece 3 can be prevented from appearing in the field of view and giving the observer a sense of displeasure.

For focusing, if the focusing handle 21 is rotated, the central shaft $l_1$ will be moved axially and the objective lens 1 will be moved in the direction of the optical axis to thereby accomplish focusing.

Also, adjustment of the eye width may be accomplished by rotating the support shaft $l_4$ about the connecting cylinder $l_3$. In that case, the members in the right and left lens barrels 4 and 4' are only parallel-moved and therefore, no hindrance is imparted to the above-described magnification changing operation.

As shown in FIGS. 9 and 10, dust-proof seals 22 and 22' may be provided for covering the openings formed in the lens barrels 4 and 4' to pass the connecting members 6 and 6' therethrough.

To make the dust or flaws on the surface of the magnification changing lens 2 invisible, it would occur to mind to provide a shutter for shielding the optical path from light by the information of the position of the magnification changing lens 2 during movement of the magnification changing lens 2, but the above-described embodiment is excellent in that it is simple in construction and can achieve the purpose inexpensively.

As described above, the present invention can quickly accomplish a magnification change by a very simple construction and eliminates the necessity of mounting and dismounting any special number, and also is convenient for carrying. Further, even if a magnification change is effected, the field stops can be arranged at optimum positions to ensure an excellent observed image to be obtained. Furthermore, the use of the toggle spring device for the movement of the magnification changing lens makes substantially invisible the dust or the like on the surface of the magnification changing lens which would otherwise be observed through the eyepiece when the magnification changing lens crosses the forward focus position of the eyepiece and thus, no sense of displeasure is given to the observer.

I claim:

1. A variable magnification observation optical device comprising:
    an objective lens;
    an eyepiece disposed rearwardly of said objective lens;
    a magnification changing lens disposed between said objective lens and said eyepiece;
    a support member for supporting said magnification changing lens so that the principal point thereof can be changed from one to the other of the objective lens side position and the eyepiece side position relative to an object image formed between said objective lens and said eyepiece by said objective lens, said support member having a field stop for at least one of a state in which the principal point of said magnification changing lens is positioned on the objective lens side and a state in which the principal point of said magnification changing lens is positioned on the eyepiece side; and
    change-over means for moving said support member to change the principal point of said magnification changing lens from said one position to said other position, thereby changing over the magnification of said optical device.

2. A variable magnification observation optical device according to claim 1, wherein said magnification changing lens has a negative refractive power and forms a low magnification state when the principal point of said magnification changing lens of negative refractive power lies at a position more adjacent to said eyepiece than the object image by said objective lens, and forms a high magnification state when said principal point lies at a position more adjacent to said objective lens than said object image.

3. A variable magnification observation optical device according to claim 2, wherein when the magnification in the high magnification state by said magnification changing lens of negative refractive power is $m^2$ ($m > 1$) times the magnification in the low magnification state and the position of the principal point of said magnification changing lens in the low magnification state is at a distance l from the objective lens side focus of said eyepiece, the focal length $f_1$ of said magnification changing lens of negative refractive power satisfies the relation that $$f_1 = \frac{ml}{1-m}.$$

4. A variable magnification observation optical device according to claim 1, wherein said magnification changing lens has a positive refractive power and forms a high magnification state when the principal point of said magnification changing lens of positive refractive power lies at a position more adjacent to said eyepiece than the object image by said objective lens, and forms a low magnification state when said principal point lies at a position mcre adjacent to said objective lens than said object image.

5. A variable magnification observation optical device according to claim 4, wherein when the magnification in the high magnification state by said magnification changing lens of positive refractive power is $m^2$ ($m > 1$) times the magnification in the low magnification state and the position of the principal point of said magnification changing lens in the low magnification state is at a distance l from the eyepiece side focus of said objective lens, the focal length $f_2$ of said magnification changing lens of positive refractive power satisfies the relation that $$f_2 = \frac{l}{m-1}.$$

6. A variable magnification observation optical device according to claim 1, wherein said change-over means moves said support member along the optical axis of said eyepiece.

7. A variable magnification observation optical device according to claim 6, wherein said magnification changing lens has two lenses spaced apart from each other at a predetermined interval, and said support member has said field stop in said predetermined interval between said two lenses.

8. A variable magnification observation optical device comprising:

an objective lens supported by an objective lens holding cylinder;

an eyepiece disposed rearwardly of said objective lens and suported by an eyepiece holding cylinder;

a device body supporting said objective lens holding cylinder and said eyepiece holding cylinder at predetermined positions; and magnification changing means for changing the size of an object image observed through said eyepiece, said magnification changing means having a magnification change operating member, a magnification changing lens disposed between said objective lens and said eyepiece, and a moving mechanism for moving said magnification changing lens along the optical axis so that in response to said magnification change operating member, the principal point of said magnification changing lens is moved from one to the other of a first position on the objective lens side and a second position on the eyepiece side relative to an object image formed between said objective lens and said eyepiece by said objective lens, said moving mechanism having a moving cylinder for suporting said magnification changing lens, and a toggle mechanism for moving said moving cylinder so that said magnification changing lens can assume said first position and said second position alternatively, and wherein said toggle mechanism includes:

an engaging projection provided on said moving cylinder;

a pivotable member having an engaging portion engaged with said engaging projection and a studded pin, said pivotable member being pivotable in a plane containing the optical axis about a central member provided integrally with said device body;

a moving pin provided on an interlocking member movable in a direction parallel to the optical axis in response to said magnification change operating member; and a spring member extending between and secured to said moving pin and said studded pin.

* * * * *